United States Patent
Kimtantas

(10) Patent No.: US 12,097,465 B2
(45) Date of Patent: Sep. 24, 2024

(54) SYSTEMS AND METHODS FOR REMOVING CARBON DIOXIDE FROM A COMBUSTION FLUE GAS AND/OR AIR

(71) Applicant: Bechtel Energy Technologies & Solutions, Inc., Houston, TX (US)

(72) Inventor: Charles L. Kimtantas, Sugar Land, TX (US)

(73) Assignee: Bechtel Energy Technologies & Solutions, Inc., Houston, TX (US)

( * ) Notice: Subject to any disclaimer, the term of this patent is extended or adjusted under 35 U.S.C. 154(b) by 0 days.

(21) Appl. No.: 18/575,375

(22) PCT Filed: Jun. 30, 2022

(86) PCT No.: PCT/US2022/035724
§ 371 (c)(1),
(2) Date: Dec. 29, 2023

(87) PCT Pub. No.: WO2023/283099
PCT Pub. Date: Jan. 12, 2023

(65) Prior Publication Data
US 2024/0261721 A1   Aug. 8, 2024

Related U.S. Application Data

(60) Provisional application No. 63/232,843, filed on Aug. 13, 2021, provisional application No. 63/219,189, filed on Jul. 7, 2021.

(51) Int. Cl.
*B01D 53/14* (2006.01)
*B01D 53/62* (2006.01)
(Continued)

(52) U.S. Cl.
CPC ..... *B01D 53/1425* (2013.01); *B01D 53/1475* (2013.01); *B01D 53/62* (2013.01);
(Continued)

(58) Field of Classification Search
CPC ............ B01D 53/1425; B01D 53/1475; B01D 53/62; B01D 53/75; B01D 53/78;
(Continued)

(56) References Cited

U.S. PATENT DOCUMENTS

| 2010/0170397 A1 | 7/2010 | Padban |
| 2011/0061533 A1 | 3/2011 | Black et al. |

(Continued)

FOREIGN PATENT DOCUMENTS

| TW | 201334850 A | 9/2013 |
| TW | 201609235 A | 3/2016 |

(Continued)

OTHER PUBLICATIONS

Kari Rodriguez; International Search Report and Written Opinion for PCT Application Serial No. PCT/US22/35724, Sep. 23, 2022, 8 pages, USPTO as the International Search Authority, Alexandria, VA.

(Continued)

*Primary Examiner* — Christopher P Jones
*Assistant Examiner* — Phillip Y Shao
(74) *Attorney, Agent, or Firm* — Crain Caton & James; William P. Jensen

(57) ABSTRACT

Systems and methods for removing carbon dioxide from a combustion flue gas and/or air by using a high-pressure aqueous ammonia solvent and a plurality of liquid driven ejectors to absorb and remove the carbon dioxide for carbon capture utilization or storage. The aqueous ammonia solvent is regenerated at a high pressure to save potential compression energy required for the absorption and removal of carbon dioxide.

20 Claims, 3 Drawing Sheets

(51) Int. Cl.
 *B01D 53/75* (2006.01)
 *B01D 53/78* (2006.01)

(52) U.S. Cl.
 CPC .............. *B01D 53/75* (2013.01); *B01D 53/78* (2013.01); *B01D 2252/102* (2013.01); *B01D 2257/504* (2013.01); *B01D 2258/0283* (2013.01); *B01D 2258/06* (2013.01)

(58) Field of Classification Search
 CPC ........ B01D 2252/102; B01D 2257/504; B01D 2258/0283; B01D 2258/06
 See application file for complete search history.

(56) References Cited

U.S. PATENT DOCUMENTS

| | | | | |
|---|---|---|---|---|
| 2011/0217218 | A1* | 9/2011 | Gupta | B01D 53/18 423/228 |
| 2013/0333568 | A1 | 12/2013 | Bockman et al. | |
| 2015/0251129 | A1* | 9/2015 | Heirman | B01D 53/80 95/190 |
| 2017/0014760 | A1 | 1/2017 | Stauffer | |
| 2020/0078730 | A1* | 3/2020 | Melin | B01D 53/1475 |
| 2020/0346163 | A1 | 11/2020 | Benali et al. | |

FOREIGN PATENT DOCUMENTS

| | | |
|---|---|---|
| WO | 2011109359 A1 | 9/2011 |
| WO | 2018206850 A1 | 11/2018 |

OTHER PUBLICATIONS

Fiona Doherty, International Preliminary Report on Patentability for PCT Application No. PCT/US22/35724, Dec. 14, 2023, 6 pages, International Bureau of WIPO; Switzerland.

Praveen Jain; Examination Report No. 1 for AU Application No. 2022306665, Jan. 31, 2024; 4 pages; IP Australia.

C. V. Chen; Office Action for TW Application No. 111125449; Feb. 9, 2023; 8 pages; Intellectual Property Office of Taiwan.

* cited by examiner

SYSTEMS AND METHODS FOR REMOVING CARBON DIOXIDE FROM A COMBUSTION FLUE GAS AND/OR AIR

CROSS-REFERENCE TO RELATED APPLICATIONS

This application is a U.S. National Stage Application of PCT Application Serial No. PCT/US22/35724 filed on Jun. 30, 2022, which claims priority to U.S. Provisional Application No. 63/232,843, filed Aug. 13, 2021, and U.S. Provisional Application No. 63/219,189, filed Jul. 7, 2021, which are incorporated herein by reference.

FIELD OF THE DISCLOSURE

The systems and methods disclosed herein generally relate to removing carbon dioxide ($CO_2$) from a combustion flue gas and/or air. More particularly, the disclosed systems and methods use a high-pressure aqueous ammonia ($NH_3$) solvent and a plurality of liquid driven ejectors to absorb and remove $CO_2$ for carbon capture utilization or storage (CCUS). The $NH_3$ solvent is regenerated at a high pressure to save potential compression energy required for the absorption and removal of $CO_2$.

BACKGROUND

Environmental concerns regarding the release of flue gas contaminants into the atmosphere from combustion plants have led to strict limits on emissions from power plants, refineries, and other industrial processes. Numerous systems and methods have been developed in response to the desire to achieve a near zero emission of contaminants such as $CO_2$. $NH_3$, for example, has been used to efficiently remove $CO_2$, as well as other contaminants, from a flue gas.

In one system referred to as a chilled ammonia process, the flue gas is treated with $NH_3$ at a low temperature (e.g., between 0°-20° C.) to absorb and remove $CO_2$. A special refrigeration system is thus, required to effectively remove $CO_2$ from the flue gas. A fan/blower is also required to move the flue gas from the power plant (or combustion system stack) to and through the $CO_2$ absorber. Because the chilled ammonia process generates a slurry (solid/liquid mixture), it requires special piping and pumping equipment to avoid the solids dropping out of the solution.

BRIEF DESCRIPTION OF THE DRAWINGS

The detailed description is described below with reference to the accompanying drawings, in which like elements are referenced with like reference numbers, in which.

DETAILED DESCRIPTION OF THE ILLUSTRATIVE EMBODIMENTS

Figure 1:
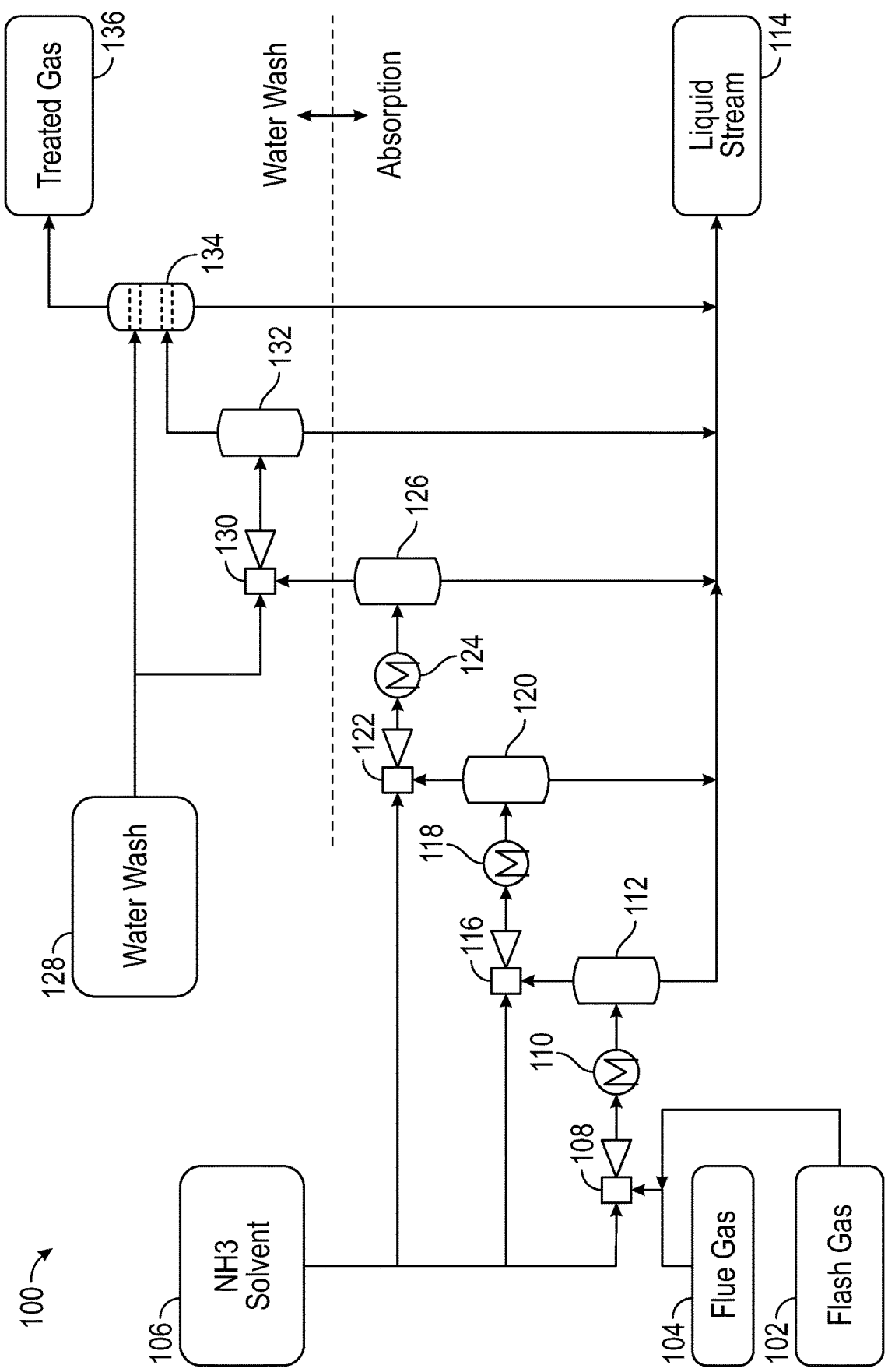
FIG. 1 is a schematic diagram illustrating an exemplary absorption and water wash section of a new system for removing $CO_2$ from a combustion flue gas.

The subject matter of the present disclosure is described with specificity, however, the description itself is not intended to limit the scope of the disclosure. The subject matter described herein thus, might also be embodied in other ways, to include different structures, steps and/or combinations similar to and/or fewer than those described herein, in conjunction with other present or future technologies. Although the term "step" may be used herein to describe different elements of methods employed, the term should not be interpreted as implying any particular order among or between various steps herein disclosed unless otherwise expressly limited by the description to a particular order. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented. To the extent that temperatures and pressures are referenced in the following description, those conditions are merely illustrative and are not meant to limit the disclosure.

The systems and methods disclosed herein enhance the removal of $CO_2$ from a combustion flue gas by using a high-pressure $NH_3$ solvent and a plurality of liquid driven ejectors to absorb and remove $CO_2$. Because the absorption operating temperature is about 90° F.-120° F., a regular water-cooling system may be used instead of the special refrigeration system used in a conventional chilled ammonia process. Moreover, the fan/blower and special piping/pumping equipment required in a conventional chilled ammonia process are not required because the $NH_3$ solvent is regenerated at a high pressure. The high-pressure regenerated $NH_3$ solvent thus, provides power to the liquid driven ejectors that discharge the flue gas at a higher pressure than a fan/blower and only require regular liquid handling piping/pumping equipment.

In one embodiment, the present disclosure includes a system for removing carbon dioxide from a combustion flue gas or air, comprising: i) a first ejector having a suction port, a motive port and an outlet; ii) an ammonia solvent liquid stream in fluid communication with the first ejector motive port; iii) a mixed feed gas stream with carbon dioxide or an air stream with carbon dioxide in fluid communication with the first ejector suction port, the mixed feed gas stream comprising a combustion flue gas stream and a flash gas stream; iv) a first two-phase fluid stream in fluid communication with the first ejector outlet and a first separator; v) a second ejector having a suction port, a motive port and an outlet; vi) a first water wash stream in fluid communication with the second ejector motive port; vii) a first gas stream connected to the first separator and the second ejector suction port, the first gas stream comprising less carbon dioxide than the mixed feed gas stream or the air stream and a residual amount of ammonia solvent from the ammonia solvent liquid stream; viii) a first liquid stream connected to the first separator, the first liquid stream comprising a portion of the ammonia solvent liquid stream and absorbed carbon dioxide; ix) a second two-phase fluid stream in fluid communication with the second ejector outlet and a second separator; x) an absorber connected to the first water wash stream; xi) a second gas stream connected to the second separator and the absorber, the second gas stream comprising less carbon dioxide and ammonia solvent than the first gas stream; xii) a second liquid stream connected to the second separator, the second liquid stream comprising another portion of the ammonia solvent liquid stream, absorbed carbon dioxide and a portion of the first water wash stream; and xiii) a treated gas stream connected to the absorber the treated gas stream comprising less carbon dioxide than the second gas stream.

In another embodiment, the present disclosure includes a method for removing carbon dioxide from a combustion flue gas or air, comprising: i) routing an ammonia solvent liquid stream through a first ejector motive port; ii) drawing a mixed feed gas stream with carbon dioxide or an air stream with carbon dioxide through a first ejector suction port, the mixed feed gas stream comprising a combustion flue gas stream and a flash gas stream; iii) discharging a first two-phase fluid stream through a first ejector outlet, the first two-phase fluid stream comprising a mixture of the ammonia solvent liquid stream and one of the mixed feed gas stream and the air stream; iv) separating the first two-phase fluid stream into a first gas stream and a first liquid stream, the first gas stream comprising less carbon dioxide than the mixed feed gas stream or the air stream and a residual amount of ammonia solvent from the ammonia solvent liquid stream and the first liquid stream comprising a portion of the ammonia solvent liquid stream and absorbed carbon dioxide; v) routing a first water wash stream through a second ejector motive port; vi) drawing the first gas stream through a second ejector suction port; vii) discharging a second two-phase fluid stream through a second ejector outlet, the second two-phase fluid stream comprising a mixture of the first water wash stream and the first gas stream; viii) separating the second two-phase fluid stream in to a second gas stream and a second liquid stream, the second gas stream comprising less carbon dioxide and ammonia solvent than the first gas stream and the second liquid stream comprising another portion of the ammonia solvent liquid stream, absorbed carbon dioxide and a portion of the first water wash stream; ix) routing the first water wash stream and the second gas stream to an absorber; and x) processing the first water wash stream and the second gas stream in the absorber to produce a treated gas stream comprising less carbon dioxide than the second gas stream.

CO2 Absorption

Referring now to FIG. 1, a schematic diagram illustrates an exemplary absorption and water wash section 100 of a new system for removing CO2 from a combustion flue gas. Flash gas 102 comprising the nitrogen, oxygen, and feed contaminants that were co-absorbed in the solvent absorption section 100 along with a small amount of unreacted CO2 and residual water vapor from a solvent regeneration section 200 of the system is mixed with a combustion flue gas 104 containing CO2 to form a mixed feed gas at about 0 PSIG (atmospheric pressure). A high pressure aqueous NH3 solvent 106 from the solvent regeneration section 200 is routed at high speed through a motive port of a first ejector 108, which draws the mixed feed gas through a suction port of the first ejector 108. The mixed feed gas and NH3 solvent 106 are mixed in the first ejector 108 at a pressure of about 0 to about 500 PSIG and discharged through an outlet as a two-phase fluid. By raising the pressure of the mixed feed gas from 0 PSIG to about 15 PSIG in the first ejector 108 using the high pressure NH3 solvent 106, absorption and reaction of CO2 from the mixed feed gas into the NH3 solvent 106 is enhanced.

The two-phase fluid is discharged from the first ejector 108 to a first heat exchanger 110 where heat from the two-phase fluid is transferred to cooling water passing through the first heat exchanger 110 to form a cooled two-phase fluid at about 90° to 120° F. At or about this temperature, absorption and reaction of CO2 from the mixed feed gas into the NH3 solvent 106 is further enhanced. The cooled two-phase fluid is routed to a first separator 112 where it is separated into a gas stream comprising the mixed feed gas with less CO2 and some residual NH3 solvent 106 and a liquid stream 114 comprising the NH3 solvent 106 and absorbed CO2.

The liquid stream 114 is routed to the solvent regeneration section 200. The high pressure aqueous NH3 solvent 106 from the solvent regeneration section 200 is routed at high speed through a motive port of a second ejector 116, which draws the gas stream from the first separator 112 through a suction port of the second ejector 116. The gas stream and NH3 solvent 106 are mixed in the second ejector 116 and discharged through an outlet as a two-phase fluid. By raising the pressure of the gas stream from 15 PSIG to about 30 PSIG in the second ejector 116 using the high pressure NH3 solvent 106, absorption of CO2 from the gas stream into the NH3 solvent 106 is enhanced.

The two-phase fluid is discharged from the second ejector 116 to a second heat exchanger 118 where heat from the two-phase fluid is transferred to cooling water passing through the second heat exchanger 118 to form a cooled two-phase fluid at about 90°–120° F. At or about this temperature, absorption and reaction of CO2 from the gas stream into the NH3 solvent 106 is further enhanced. The cooled two-phase fluid is routed to a second separator 120 where it is further separated into a gas stream comprising the gas stream from the first separator 112 with less CO2 and some residual NH3 solvent 106 and a liquid stream 114 comprising the NH3 solvent 106 and absorbed CO2.

The liquid stream 114 is routed to the solvent regeneration section 200. The high pressure aqueous NH3 solvent 106 from the solvent regeneration section 200 is routed at high speed through a motive port of a third ejector 122, which draws the gas stream from the second separator 120 through a suction port of the third ejector 122. The gas stream and NH3 solvent 106 are mixed in the third ejector 122 and discharged through an outlet as a two-phase fluid. By raising the pressure of the gas stream from 30 PSIG to about 45 PSIG in the third ejector 122 using the high pressure NH3 solvent 106, absorption of CO2 from the gas stream into the NH3 solvent 106 is enhanced.

The two-phase fluid is discharged from the third ejector 122 to a third heat exchanger 124 where heat from the two-phase fluid is transferred to cooling water passing through the third heat exchanger 124 to form a cooled two-phase fluid at about 90°-120° F. At or about this temperature, absorption and reaction of CO2 from the gas stream into the NH3 solvent 106 is further enhanced. The cooled two-phase fluid is routed to a third separator 126 where it is further separated into a gas stream comprising the gas stream from the second separator 120 with less CO2 and NH3 solvent 106 and a liquid stream 114 comprising the NH3 solvent 106 and absorbed CO2.

Although three liquid driven ejectors are described herein for enhancing CO2 absorption by the NH3 solvent 106, a different number may be used, instead, depending on different constraints (e.g., cost, space, environmental). One or more liquid driven ejectors, for example, may provide sufficient CO2 absorption based on the relevant constraints. Likewise, a different number of heat exchangers may be used to further enhance CO2 absorption depending on the same constraints.

The liquid stream 114 is routed to the solvent regeneration section 200. A medium-pressure water wash 128 from a solvent recovery section 300 is routed at high speed through a motive port of a fourth ejector 130, which draws the gas stream from the third separator 126 through a suction port of the fourth ejector 130. The gas stream and water wash 128 are mixed in the fourth ejector 130 and discharged through an outlet as a two-phase fluid. By raising the pressure of the gas stream from 45 PSIG to about 55 PSIG in the fourth ejector 130 using the medium-pressure water wash 128, absorption of CO2 and NH3 solvent 106 from the gas stream into the water wash 128 is enhanced.

The two-phase fluid is discharged from the fourth ejector 130 to a fourth separator 132 where it is further separated into a gas stream comprising the gas stream from the third separator 126 with trace amounts of CO2 and NH3 solvent 106 and a liquid stream 114 comprising the water wash, NH3 solvent 106 and CO2.

The liquid stream 114 is routed to the solvent regeneration section 200 and the gas stream from the fourth separator 132 is routed to a lower section of an absorber 134. The absorber 134 may include trays and/or packing, which separate the trace amounts of CO2 and NH3 solvent 106 from the fourth separator 132 gas stream and produce the liquid stream 114 comprising the water wash, NH3 solvent 106 and CO2. The absorber 134 also produces a treated gas 136, which is vented to the atmosphere and comprises the nitrogen, oxygen, and feed contaminants that were co-absorbed in the solvent absorption section 100 along with a trace amount of unreacted CO2, unreacted solvent, and residual water vapor.

Solvent Regeneration

Figure 2:
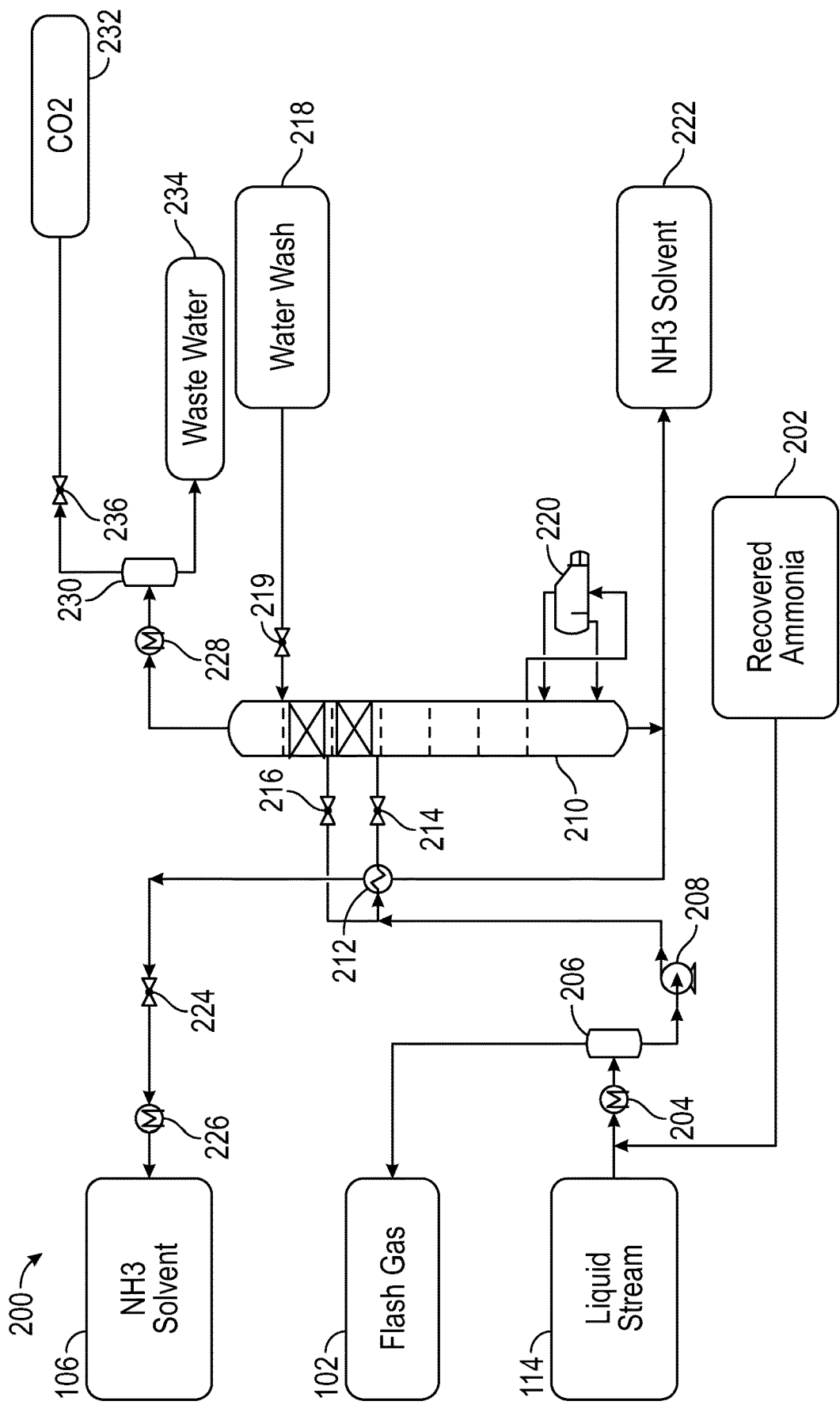
FIG. 2 is a schematic diagram illustrating an exemplary solvent regeneration section of the new system for removing $CO_2$ from a combustion flue gas.

Referring now to FIG. 2, a schematic diagram illustrates an exemplary solvent regeneration section 200 of the new system for removing CO2 from a combustion flue gas. The liquid stream 114 from the absorption and water wash section 100 is mixed with NH3 202 recovered from the solvent recovery section 300 to produce a mixed liquid feed. The mixed liquid feed is fed to a fourth heat exchanger 204 where heat from the mixed liquid feed is transferred to cooling water passing through the fourth heat exchanger 204 to form a cooled two-phase fluid. The cooled two-phase fluid passes through the fourth heat exchanger 204 to a fifth separator 206 where it is separated into the flash gas 102 and a liquid stream comprising water wash, NH3 solvent 106 and CO2.

A pump 208 is used to transfer the liquid stream from the fifth separator 206 at a high pressure of about 625 PSIG to an upper section of a regenerator 210. A portion of the liquid stream pumped from the fifth separator 206 may be heated by routing it through a fifth heat exchanger 212 where heat from the NH3 solvent 106 (from the bottom of the regenerator 210) passing through the fifth heat exchanger 212 is transferred to the liquid stream. The liquid stream from the fifth separator 206 may be pumped directly to the regenerator 210 and/or through the fifth heat exchanger 212 to the regenerator 210 by controlling valves 214 and 216. In this manner, a temperature profile for the liquid stream pumped from the fifth separator 206 to the regenerator 210 can be controlled. A water wash 218 is controllably released from the solvent recovery section 300 to an upper section of the regenerator 210 by valve 219. By controlling the temperature profile of the liquid stream pumped from the fifth separator 206 and using the water wash 218, the liquid stream pumped from the fifth separator 206 is separated into a gas stream comprising CO2 and a liquid stream comprising the NH3 solvent 106 and the water wash 218. A reboiler 220 is used to heat the solvent and break the NH3-CO2 bond, generate steam, and then the steam will strip the released CO2 out of the solvent.

The liquid stream from the regenerator 210 may be routed as NH3 solvent 222 to the solvent recovery section 300 and/or as NH3 solvent 106 to the absorption and water wash section 100 by controlling valve 224. The liquid stream routed as NH3 solvent 106 to the absorption and water wash section 100 passes through the fifth heat exchanger 212 where it is cooled and a sixth heat exchanger 226 where it is further cooled by cooling water passing through the sixth heat exchanger 226 to form the NH3 solvent 106 routed to the absorption and water wash section 100.

The gas stream from the regenerator 210 flows through a seventh heat exchanger 228 where heat from the gas stream is transferred to cooling water passing through the seventh heat exchanger 228 to form a cooled two-phase fluid comprising water and CO2. The cooled two-phase fluid is routed to a sixth separator 230 where it is separated into a gas stream 232 comprising CO2 at a high pressure of about 400-550 PSIG and a liquid stream 234 comprising water. The gas stream 232 may be controllably released to the system battery limits for CCUS by a valve 236 and the liquid stream 234 may be sent to recycle outside the system battery limits. By producing the CO2 at a high-pressure for CCUS, multiple stages of CO2 compression are eliminated when compared to an amine system, which produces the CO2 at 10-20 PSIG.

Solvent Recovery

Figure 3:
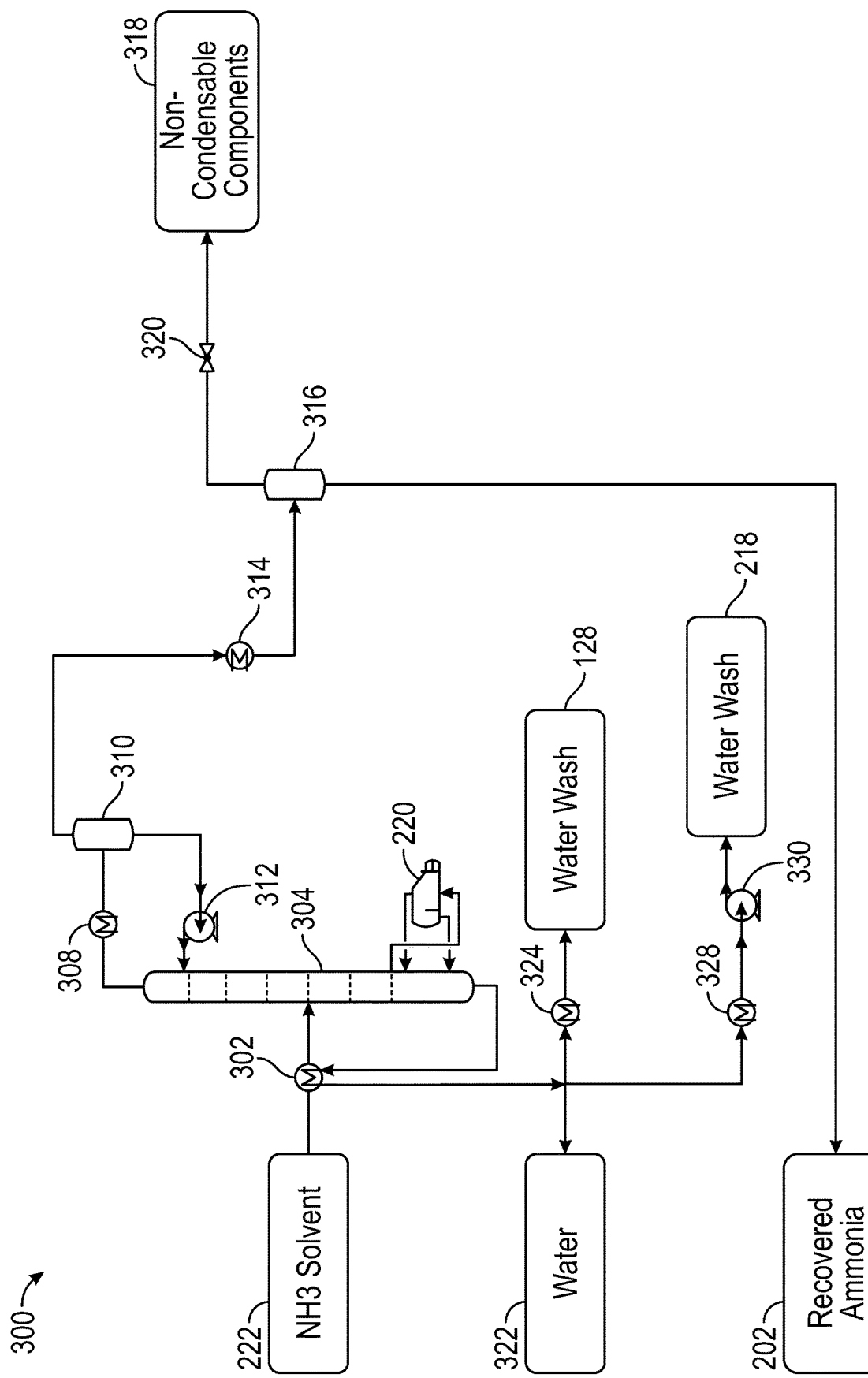
FIG. 3 is a schematic diagram illustrating an exemplary solvent recovery section of the new system for removing $CO_2$ from a combustion flue gas.

Referring now to FIG. 3, a schematic diagram illustrates an exemplary solvent recovery section 300 of the new system for removing CO2 from a combustion flue gas. NH3 solvent 222 from the solvent regeneration section 200 is fed through an eighth heat exchanger 302, where it is heated, to a distillation column 304. The distillation column 304 includes a trayed or packed vertical vessel, which separates the NH3 solvent 222 into a gas stream and a liquid stream. The gas stream from the distillation column 304 comprises the recovered NH3 stream 202 and the non-condensable component stream 318. The liquid stream comprises the water wash streams 128 and 218 and the excess water stream 322. A reboiler 306 is used to heat the solution and separate the NH3 and water and to then strip the released NH3 out of the solution.

The gas stream from the distillation column 304 flows through a ninth heat exchanger 308 where heat from the gas stream is transferred to cooling water passing through the ninth heat exchanger 308 to form a cooled two-phase fluid comprising the recovered NH3 202 and residual reflux. The cooled two-phase fluid is routed to a seventh separator 310 where it is separated into a gas stream comprising the NH3 solvent and a liquid stream comprising water that is pumped back to the distillation column 304 using a pump 312.

The gas stream from the seventh separator 310 is sent to a tenth heat exchanger 314 where heat from the gas stream is transferred to cooling water passing through the tenth heat exchanger 314 to form a cooled two-phase fluid comprising NH3 and non-condensable components that may have accumulated in the NH3 solvent. The cooled two-phase fluid is routed to an eighth separator 316 where it is separated into a gas stream comprising any non-condensable components 318 and a liquid stream comprising the recovered NH3 202. The gas stream 318 from the eighth separator 316 is controllably vented to the atmosphere by valve 320 and the recovered NH3 liquid stream 202 is routed to the solvent regeneration section 200.

The liquid stream from the distillation column 304 flows through the eighth heat exchanger 302 where it is cooled. The cooled liquid stream comprising water may be routed to the absorption and water wash section 100, the solvent regeneration section 200 and/or outside the system battery limits as excess water 322 to recycle. The cooled liquid stream may be further cooled before it is routed to the absorption and water wash section 100 as water wash 128 by sending it through an eleventh heat exchanger 324 where heat from the cooled liquid stream is transferred to cooling water passing through each heat exchanger. The cooled liquid stream may be further cooled before it is routed to the solvent regeneration section 200 as water wash 218 by sending it through a thirteenth heat exchanger 328 where heat from the cooled liquid stream is transferred to cooling water passing through the thirteenth heat exchanger 328. A pump 330 may be used to facilitate routing the cooled liquid stream as water wash 218 to the solvent regeneration section 200.

A simulation of the system was developed using a Pro-Max Simulation program. The simulation confirms the feasibility of the system and the quality of the products produced by the methods. The simulation also provides energy and utility requirement information. The simulation used a combustion flue gas that contained approximately 71.9 vol % nitrogen, 6.6 vol % oxygen, 6.9 vol % carbon dioxide and 14.5 vol % water vapor with trace quantities of 0.2 PPMV sulfur dioxide, 0.001 PPMV sulfur trioxide, and 25 PPMV carbon monoxide. The carbon dioxide recovery calculated by the simulation indicated over 99% carbon dioxide recovery with a product that is over 99% carbon dioxide at 500 PSIG and 100° F.

The simulation indicates that the electric power required for the pumps is less than 75 kW-h of electric power per ton of carbon dioxide recovered. The system does require a heating media for the two reboilers and cooling water for the various cooling requirements. The heating media required for the reboilers will need to boil the solvent at approximately 400° F. and 360° F. and the total heating requirement is about 30 MMBTU/Ton of carbon dioxide recovered. The cooling water required is expected to cool and condense the various process streams to about 100° F. and will be about 33 MMBTU/Ton of carbon dioxide recovered.

While the present disclosure has been described in connection with presently preferred embodiments, it will be understood by those skilled in the art that it is not intended to limit the disclosure of those embodiments. For example, the systems and methods may be applied to remove CO2 from air in the atmosphere. It is therefore contemplated that various alternative embodiments and modifications may be made to the disclosed embodiments without departing from the spirit and scope of the disclosure defined by the appended claims and equivalents thereof.

The invention claimed is:

1. A system for removing carbon dioxide from a combustion flue gas or air, comprising:
   a first ejector having a suction port, a motive port and an outlet;
   an ammonia solvent liquid stream in fluid communication with the first ejector motive port;
   a mixed feed gas stream with carbon dioxide or an air stream with carbon dioxide in fluid communication with the first ejector suction port, the mixed feed gas stream comprising a combustion flue gas stream and a flash gas stream;
   a first two-phase fluid stream in fluid communication with the first ejector outlet and a first separator;
   a second ejector having a suction port, a motive port and an outlet;
   a first water wash stream in fluid communication with the second ejector motive port;
   a first gas stream connected to the first separator and the second ejector suction port, the first gas stream comprising less carbon dioxide than the mixed feed gas stream or the air stream and a residual amount of ammonia solvent from the ammonia solvent liquid stream;
   a first liquid stream connected to the first separator, the first liquid stream comprising a portion of the ammonia solvent liquid stream and absorbed carbon dioxide;
   a second two-phase fluid stream in fluid communication with the second ejector outlet and a second separator;
   an absorber connected to the first water wash stream;
   a second gas stream connected to the second separator and the absorber, the second gas stream comprising less carbon dioxide and ammonia solvent than the first gas stream;
   a second liquid stream connected to the second separator, the second liquid stream comprising another portion of the ammonia solvent liquid stream, absorbed carbon dioxide and a portion of the first water wash stream; and
   a treated gas stream connected to the absorber the treated gas stream comprising less carbon dioxide than the second gas stream.

2. The system of claim 1, further comprising a first heat exchanger positioned between the first ejector and the first separator and enclosing a portion of the first two-phase fluid stream and a first portion of a cooled water stream.

3. The system of claim 2, further comprising a second heat exchanger enclosing a portion of a mixed liquid feed stream comprising the first liquid stream, the second liquid stream and a recovered ammonia stream and a second portion of the cooled water stream.

4. The system of claim 3, further comprising a third separator in fluid communication with the mixed liquid feed stream and connected to the flash gas stream and a third liquid stream comprising ammonia solvent in the ammonia solvent liquid stream and carbon dioxide.

5. The system of claim 4, further comprising a regenerator in fluid communication with the third liquid stream and connected to a third gas stream comprising carbon dioxide and a fourth liquid stream comprising the ammonia solvent in the ammonia solvent liquid stream and water in the first water wash stream and a second water wash stream.

6. The system of claim 5, wherein the second water wash stream is connected to an upper section of the regenerator.

7. The system of claim 6, further comprising a third heat exchanger enclosing a portion of the third liquid stream and a portion of the fourth liquid stream.

8. The system of claim 7, further comprising a fourth heat exchanger enclosing a portion of the fourth liquid stream and a portion of a fifth liquid stream comprising the first water wash stream, the second water wash stream and a third water wash stream.

9. The system of claim 8, further comprising a distillation column connected to the fourth liquid stream, the fifth liquid stream and a fourth gas stream comprising the recovered ammonia stream and a non-condensable component stream.

10. The system of claim 9, further comprising a fourth separator in fluid communication with the fourth gas stream and connected to the recovered ammonia stream and the non-condensable component stream.

11. A method for removing carbon dioxide from a combustion flue gas or air, comprising:
    routing an ammonia solvent liquid stream through a first ejector motive port;

drawing a mixed feed gas stream with carbon dioxide or an air stream with carbon dioxide through a first ejector suction port, the mixed feed gas stream comprising a combustion flue gas stream and a flash gas stream;

discharging a first two-phase fluid stream through a first ejector outlet, the first two-phase fluid stream comprising a mixture of the ammonia solvent liquid stream and one of the mixed feed gas stream and the air stream;

separating the first two-phase fluid stream into a first gas stream and a first liquid stream, the first gas stream comprising less carbon dioxide than the mixed feed gas stream or the air stream and a residual amount of ammonia solvent from the ammonia solvent liquid stream and the first liquid stream comprising a portion of the ammonia solvent liquid stream and absorbed carbon dioxide;

routing a first water wash stream through a second ejector motive port;

drawing the first gas stream through a second ejector suction port;

discharging a second two-phase fluid stream through a second ejector outlet, the second two-phase fluid stream comprising a mixture of the first water wash stream and the first gas stream;

separating the second two-phase fluid stream into a second gas stream and a second liquid stream, the second gas stream comprising less carbon dioxide and ammonia solvent than the first gas stream and the second liquid stream comprising another portion of the ammonia solvent liquid stream, absorbed carbon dioxide and a portion of the first water wash stream;

routing the first water wash stream and the second gas stream to an absorber; and processing the first water wash stream and the second gas stream in the absorber to produce a treated gas stream comprising less carbon dioxide than the second gas stream.

12. The method of claim 11, further comprising cooling the first two-phase fluid stream.

13. The method of claim 12, further comprising cooling a mixed liquid feed stream comprising the first liquid stream, the second liquid stream and a recovered ammonia stream.

14. The method of claim 13, further comprising separating the mixed liquid feed stream into the flash gas stream and a third liquid stream comprising ammonia solvent in the ammonia solvent liquid stream and carbon dioxide.

15. The method of claim 14, further comprising separating the third liquid stream into a third gas stream comprising carbon dioxide and a fourth liquid stream comprising the ammonia solvent in the ammonia solvent liquid stream and water in the first water wash stream and a second water wash stream.

16. The method of claim 15, further comprising cooling the fourth liquid stream using the third liquid stream.

17. The method of claim 16, further comprising heating the fourth liquid stream using a fifth liquid stream comprising the first water wash stream, the second water wash stream and a third water wash stream.

18. The method of claim 17, further comprising separating the fourth liquid stream into the fifth liquid stream and a fourth gas stream comprising the recovered ammonia stream and a non-condensable component stream.

19. The method of claim 18, further comprising separating the fourth gas stream into the recovered ammonia stream and the non-condensable component stream.

20. The method of claim 11, wherein a pressure of the mixed feed gas stream or the air stream is increased from about 0 PSIG to about 15 PSIG after it is drawn through the first ejector suction port.

* * * * *